(No Model.)

C. A. SHERMAN.
FRUIT KNIFE.

No. 457,376. Patented Aug. 11, 1891.

WITNESSES
Wm Messer
Arthur B. Jenkins

INVENTOR
Chauncey A. Sherman.
By Simonds & Burdett
Attorneys

UNITED STATES PATENT OFFICE.

CHAUNCEY A. SHERMAN, OF NORWICH, ASSIGNOR TO WILLIAM H. WATROUS, OF HARTFORD, CONNECTICUT.

FRUIT-KNIFE.

SPECIFICATION forming part of Letters Patent No. 457,376, dated August 11, 1891.

Application filed May 25, 1891. Serial No. 393,957. (No model.)

*To all whom it may concern:*

Be it known that I, CHAUNCEY A. SHERMAN, of Norwich, in the county of New London and State of Connecticut, have invented certain new and useful Improvements in Fruit-Knives, of which the following is a full, clear, and exact description, whereby any one skilled in the art can make and use the same.

The object of my invention is to provide in the one structure a knife that shall be particularly adapted for use in preparing oranges or the like fruit for eating; and to this end my invention consists in a fruit-knife having the peculiar features of construction as more particularly hereinafter described, and pointed out in the claim.

Figure 1:
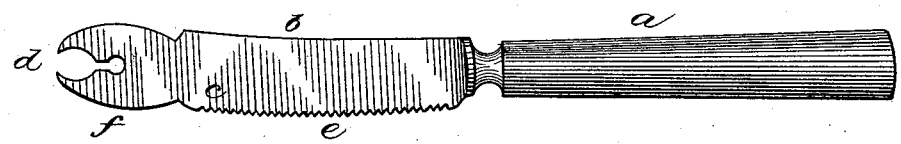
Figure 2:

Referring to the drawings, Figure 1 is a detail side view of a knife embodying my invention. Fig. 2 is a detail view of the same, showing the edge of the blade.

In the accompanying drawings, the letter $a$ denotes the handle of the knife, $b$ the blade, $c$ the cutting-edge, and $d$ the point. This knife is made of any suitable material, preferably steel, forged to shape and suitably ground and finished, and it may be made plain or plated. The greater extent of the blade from the heel toward the point is serrated, this saw portion $e$ of the blade being particularly useful in cutting through an orange or other fruit having a tough peel. The point of the knife has a cutting-section $f$, preferably curved and brought to a fairly-sharp edge to adapt it for ordinary cutting purposes, while the point is bifurcated, as shown, by cutting away an oval or rounded portion, leaving an opening that particularly adapts the point for use in removing seeds from oranges. Where a knife has but a single point, as it is usually made, it is very difficult, if not impossible, to remove an orange-seed that is usually very slippery, and for that reason resists ordinary efforts to dislodge it. By means of the improved device herein shown and described a seed of an orange is easily removed, as it can be grasped on at least two sides and prevent it from slipping aside in the attempt to remove it. These several features combined in one knife provide a simple and durable device that meets all the requirements of a fruit-knife that is particularly adapted for table use.

I claim as my invention—

As an improved article of manufacture, a fruit-knife having a blade comprising a saw-section and cutting-section at and near the point, and the bifurcated end forming a seed-remover, all substantially as described.

CHAUNCEY A. SHERMAN.

Witnesses:
FRANK H. ALLEN,
ALONZO M. LUTHER.